United States Patent [19]
Roberts

[11] Patent Number: 4,611,884
[45] Date of Patent: Sep. 16, 1986

[54] BI-DIRECTIONAL OPTICAL FIBER COUPLER

[75] Inventor: Harold Roberts, Westboro, Mass.

[73] Assignee: Magnetic Controls Company, Minneapolis, Minn.

[21] Appl. No.: 444,494

[22] Filed: Nov. 24, 1982

[51] Int. Cl.$^4$ .......................... G02B 6/26; G02B 6/32

[52] U.S. Cl. .................. 350/96.15; 250/227; 350/96.18

[58] Field of Search .................... 250/227; 357/30, 72; 350/96.15, 96.16, 96.18, 96.20

[56] References Cited

U.S. PATENT DOCUMENTS

| | | | |
|---|---|---|---|
| 3,350,654 | 10/1967 | Snitzer | 329/144 |
| 4,021,099 | 5/1977 | Kawasaki et al. | 350/96.15 |
| 4,130,343 | 12/1978 | Miller et al. | 350/96.15 |
| 4,134,640 | 1/1979 | Auracher et al. | 350/96.15 |
| 4,154,529 | 5/1979 | Dyott | 350/96.18 |
| 4,165,496 | 8/1979 | Di Domenico, Jr. et al. | 350/96.15 |
| 4,169,656 | 10/1979 | Hodge | 350/96.15 |
| 4,186,996 | 2/1980 | Bowen et al. | 350/96.20 |
| 4,197,007 | 4/1980 | Costa et al. | 356/73.1 |
| 4,210,923 | 7/1980 | North et al. | 357/30 |
| 4,243,297 | 1/1981 | Elion | 350/96.15 |
| 4,273,445 | 6/1981 | Thompson et al. | 356/350 |
| 4,278,323 | 7/1981 | Waldman | 350/96.20 |
| 4,279,465 | 7/1981 | Vojvodich | 350/96.20 |
| 4,296,995 | 10/1981 | Bickel | 350/96.15 |
| 4,314,740 | 2/1982 | Bickel | 350/96.15 |
| 4,320,938 | 3/1982 | Gunnersen et al. | 350/96.21 |
| 4,327,963 | 5/1982 | Khoe et al. | 350/96.18 |
| 4,329,017 | 5/1982 | Kapany et al. | 350/96.15 |
| 4,360,248 | 11/1982 | Bickel et al. | 350/96.16 |
| 4,420,219 | 12/1983 | Muchel | 350/96.18 |
| 4,421,383 | 12/1983 | Carlsen | 350/96.18 |
| 4,422,714 | 12/1983 | Benoit et al. | 350/96.15 |
| 4,423,922 | 1/1984 | Porter | 350/96.15 |
| 4,441,784 | 4/1984 | Korth | 350/96.15 |
| 4,452,505 | 6/1984 | Gasparian | 350/96.15 |

FOREIGN PATENT DOCUMENTS

| | | | |
|---|---|---|---|
| 79557 | 7/1978 | Japan | 350/96.15 |
| 56-809 | 7/1981 | Japan | 350/96.15 |

OTHER PUBLICATIONS

Shekita et al., IBM Tech. Discl. Bull., vol. 25, No. 8, Jan. 1983, "Fiber-Optic Connector with Inherent Wrap Capability", pp. 4095-4096.

Archey et al., *IBM Technical Disclosure Bulletin,* vol. 22, No. 12, May 1980, "Low Loss Optical Coupler", pp. 5288-5290.

*Primary Examiner*—William L. Sikes
*Assistant Examiner*—Frank González
*Attorney, Agent, or Firm*—Weingarten, Schurgin, Gagnebin & Hayes

[57] ABSTRACT

A bi-directional, fiber optic coupler operative to receive from an optical fiber, modulated light for detection thereof, and for applying to the same fiber, modulated light for transmission to a remote location. The coupler comprises a body which can be conveniently and economically molded as a unitary plastic element and in which a V-channel is formed to receive and securely hold the optical fiber. The channel terminates in a slanted reflecting face which is readily coated with a dielectric layer to provide a beam splitting function, or in the case of dual frequency transmissions, a frequency dependent layer to provide multiplexing or demultiplexing. The slanted reflecting face is located at the bottom of an emitter cavity in which an emitter assembly is readily press-fit to provide predetermined alignment between light emanating from the emitter assembly and the reflecting face from which the light is reflected into the adjacent termination of the optical fiber. A detector cavity is formed within the body and positioned to receive light passing through the reflecting face. The transiting light is refracted downward toward the detector cavity which is positioned off axis. An index of refraction matching material may be applied between the optical fiber and reflecting face in which case the reflecting face passes the incoming light directly along the axis. A portion of the transmitted light is totally internally reflected by the bottom surface of the emitter cavity which is formed to provide a mirror surface that redirects that light toward the detector cavity. A lens may be molded directly into the coupler body to gather light passing through and refracted by the reflecting face. For the portion of light generated by the emitter and passing through the reflective face, a reflective wedge is provided in the bottom of the coupler body to direct that radiation away from the detector to reduce cross talk.

18 Claims, 8 Drawing Figures

BI-DIRECTIONAL OPTICAL FIBER COUPLER

FIELD AND BACKGROUND OF THE INVENTION

The present invention relates to a coupler for light carried by an optical fiber. In particular it is desirable to be able to provide a single coupler for bi-directional operation of an optical fiber such that radiation transmitted along the fiber from a remote location can be detected to provide electrical signals corresponding to the modulation on the light. At the same time light, modulated in accordance with desired electrical signals, is to be applied to the optical fiber for transmission to the remote location. Such a function is important to bi-directional communications utilizing optical fibers.

In providing such a coupling function, it is desirable that the coupling to and from the optical fiber be accomplished in a single device. It is also important that the attenuation in the radiation supplied to and received from the fiber be as minimal as possible. Finally, it is important that cross talk, or reception by the detector of a portion of the radiation intended for transmission along the fiber to the remote location, be kept acceptably low so as not to impair the signal quality of the detected incoming light.

Such couplers are likely to be utilized in great numbers making it important for economical, high volume production to be available for such a coupler. At the same time such couplers are likely to be installed in the field where complex alignment procedures are impractical.

BRIEF SUMMARY OF THE INVENTION

In accordance with the teaching of the present invention, a coupler is provided for receiving and detecting light transmitted along an optical fiber from a remote location and for applying to the fiber for transmission to the remote location light generated in response to electrical signals. The coupler is conveniently molded as a unitary plastic part which can be efficiently and economically reproduced in large numbers. An inclined face is located at the junction of the incoming and outgoing beams and is dielectric coated to provide a beam splitting function. Incoming light is transmitted along an optical fiber placed in a channel. The light is divided by the beam splitting face with a portion directed toward a detector located within a molded-in coupler cavity. A separate emitter cavity is provided within the coupler body to prealign an emitter assembly with respect to the reflecting face to insure that light from the emitter is directed toward the reflecting face for reflection into the channel located optical fiber. Emitter radiation passing through the reflecting face is directed away from the detector cavity and may be absorbed by an absorbing coating on the coupler body to prevent cross talk with the incoming light.

Typically the interface between the optical fiber termination and the reflecting face is filled with an index of refraction matching material such that the light passes on axis directly through the reflecting face, and is partially reflected by the bottom surface of the emitter cavity as it passes toward the detector cavity. Without the index matching material, the radiation directed toward the detector cavity is refracted at the beam splitting interface with the coupler body and the detector may be displaced slightly off axis from the optical fiber to best receive this light. Typically, a relatively large active area is available on the detector so that good coupling can be achieved in spite of poor alignment or a large intervening distance from the fiber to detector. The emitter cavity may be located more remotely from the reflecting face and imaging optics utilized to concentrate the emitter light directly onto the reflecting face. This allows the detector cavity to be located more proximate to the reflecting face and avoid intervening coupler body reflecting surfaces.

Where desired, a focusing lens for the incoming radiation received after passing through the reflecting face can be molded directly into the coupler body to interface with small area detectors.

The emitter cavity is typically configured to provide a pressfit with the emitter assembly that provides predetermined alignment of the emitter output light with respect to the reflecting face and of the position of the reflected beam with respect to the optical fiber termination to insure optimal coupling of the emitter radiation into the optical fiber.

The coupler can be provided with a dielectric coating of a frequency sensitive nature on the reflective face to provide a multiplexing or demultiplexing function utilizing two emitters or two detectors and frequency separated radiation in the optical fiber.

BRIEF DESCRIPTION OF THE DRAWING

These and other features of the present invention are more fully set forth below in the solely exemplary detailed description and accompanying drawing of which.

DETAILED DESCRIPTION OF THE INVENTION

The present invention contemplates a bi-directional coupler for light transmitted along an optical fiber. The coupler is conveniently molded as a unitary plastic structure and provides high efficiency with low cross talk in coupling radiation between the optical fiber and an emitter or a detector. Multiplexing and demultiplexing functions are also provided by the coupler using two emitters or detectors and radiation at different frequencies.

Figure 1A:
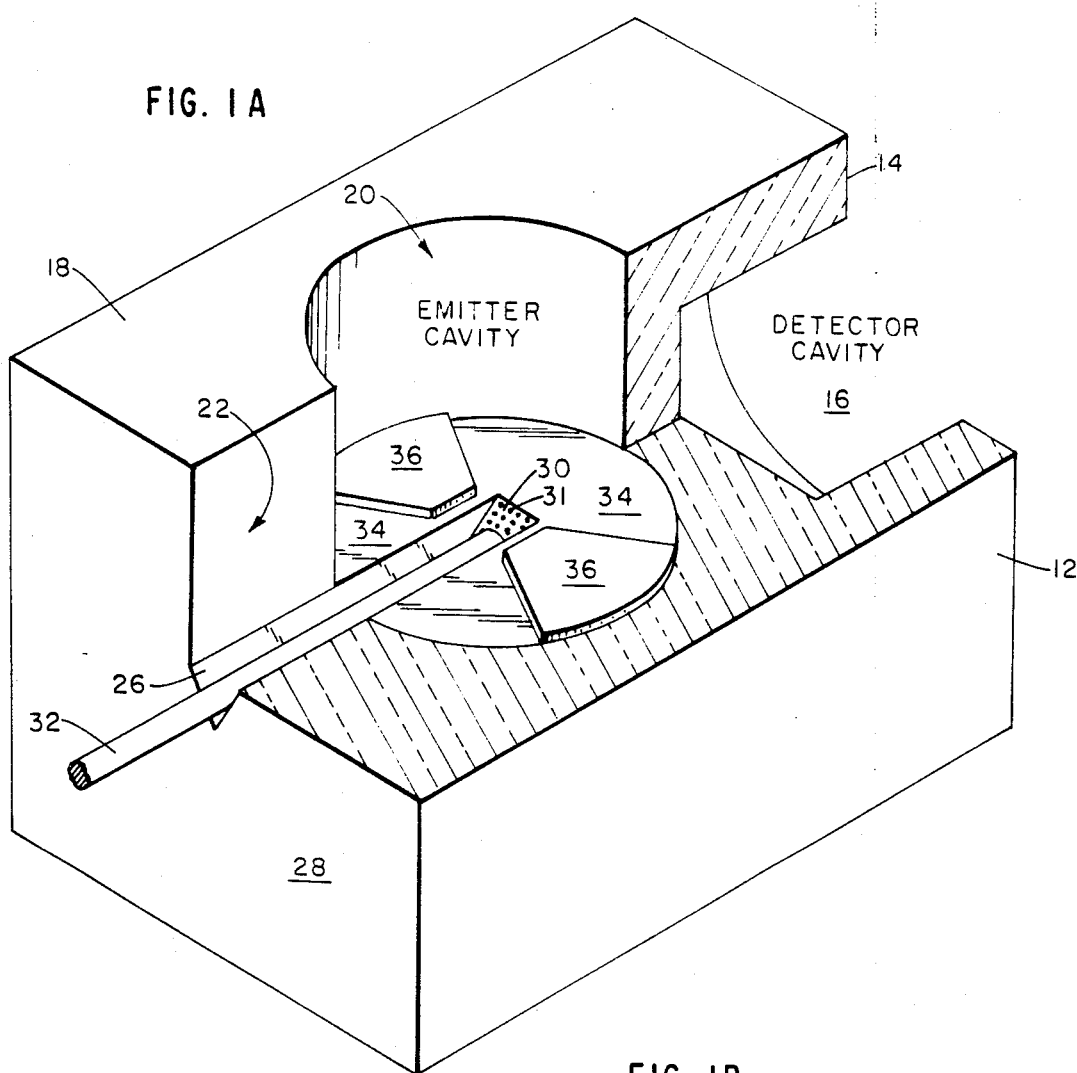
FIGS. 1A and 1B are respectively partially cut-away and sectional views of alternative coupler bodies according to the present invention.
Figure 1B:
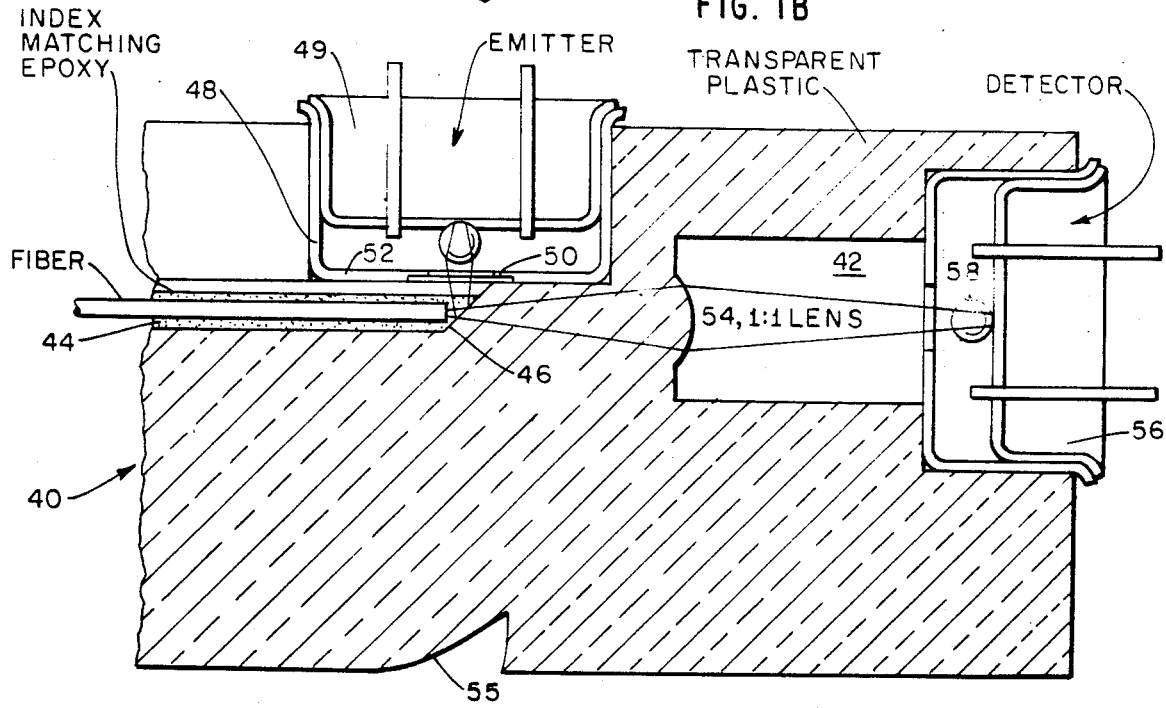

The coupler comprises a body 12, illustrated in FIGS. 1A and 1B, and is conveniently molded as a unitary acrylic or polycarbonate plastic piece. For this purpose, Lexan, a trademark for a moldable polycarbonate plastic of the General Electric Company, is usable. The body 12 has on one face 14 a detector cavity 16 and on a second face 18 an emitter cavity 20. A trough 22 is cut in the face 18 providing a first wall 24 and facing second wall (not shown) and terminating in a V-shaped channel 26. The V-shaped channel 26 extends from a surface 28 of the body 12, opposite the surface 14, into the body 12, terminating at a 45° angled reflecting face 30 located at the bottom of the emitter cavity 20. The face 30 is typically coated with a dielectric layer to function as a beam splitter for radiation received from an optical fiber 32, or from an emitter assembly inserted within the cavity 20.

The reflecting face 30 is precisely located with respect to the cavity 20 to receive light from an emitter assembly within the emitter cavity 20 and having a precisely concentric or centered beam of radiation emanating therefrom. The reflecting face 30 provides precise alignment between the radiation received from the emitter assembly and the termination of the optical fiber 32 for optimal coupling of the emitter radiation into the fiber 32.

Figure 2A:
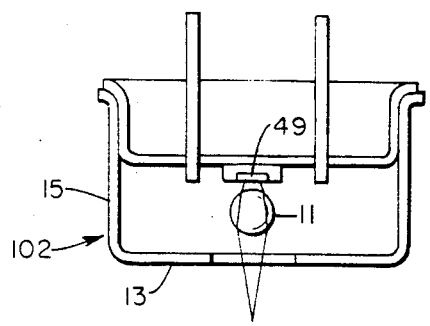
FIGS. 2A and 2B are diagrammatic views of conventional emitters for use in the present invention.
Figure 2B:
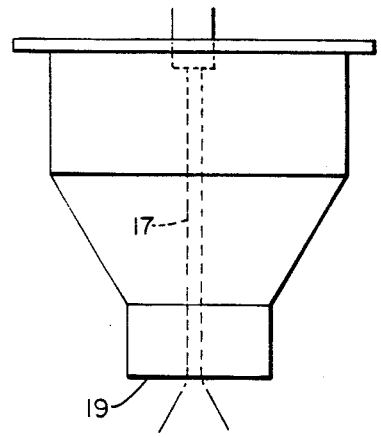

Various concentrically radiating emitter assemblies are available as shown by FIGS. 2A and 2B. In FIG. 2A, the emitter includes an active, light emitting semiconductor element 9, the radiation from which is focused by a spherical lens 11 to a point preferably outside a window 13 in a metal container 15. The focal point is positioned to coincide with the location of the fiber termination after reflection by face 30. Emitters are available with focal points located beyond the window, and highly concentric to the container 15. The coupler body 12 is dimensioned to provide an interference fit of the emitter of FIG. 2A into the cavity 20 to permit consistent alignment without field adjustment. Another form of emitter is shown in FIG. 2B where a pigtail 17 of optical fiber transmits the light emitted by the semiconductor element to the front surface 19 as an intense spot. Examples of available emitters are the Motorola MFOE108F, Laser Diode Labs IRE161 or Spectronics "sweetspot" LED.

The V-groove of the channel 26 provides precise placement of the optical fiber 32 and permits its termination to be located and butted as close to the surface 30 as possible for consistent alignment. The fiber 32 is typically cemented within the channel 26 and such cement may include an epoxy filling the region between the termination of the fiber 32 and reflecting face 30 with an index of refraction matching that of the body 12 to prevent refraction of the radiation passing through the beam splitting reflecting surface 30.

In coating the reflecting surface 30 with a dielectric layer 31 in order to provide, typically, a 50/50 beam splitting function, it is noted that the coating need not be confined to the surface 30 alone but may be more generally applied as is more convenient in coating technologies without impairing the function of the coupler.

The emitter cavity 20 terminates in a bottom surface 34 which has a pair of raised ledges 36 that locate the inserted emitter just above the bottom surface 34 to prevent contact therewith and to facilitate, where desired, total internal reflection of radiation passing from fiber 32 through face 30 into the body 12 towards detector cavity 16, as will be explained more fully below. A large area detector is preferably installed in the cavity 16 to respond to the radiation passing through the face 30 and passing into cavity 16 directly or by total internal reflection from the bottom surface 34.

FIG. 1B illustrates in cross section further features of an alternative coupler according to the invention. In FIG. 1B, a block 40 of molded plastic comprises the coupler body. Body 40 has an aperture 42, typically for a small area detector, to receive light from an optical fiber located within a V-groove 44 after passing through a reflecting face 46 at the inner termination of the V-groove 44. An emitter cavity 48 terminates just above the reflecting face 46 with a set of wedges 50 used to position the emitter assembly above a bottom face 52 of the emitter cavity 48. In the case where an index matching fluid is applied within the V-groove 44, light emitting from the optical fiber in the groove 44 will transit the reflecting face 46 in the axial direction, without refraction. A focusing surface 54, interfacing with cavity 42 in the light path, directs the transmitted light toward a detector 56. The detector 56 includes a lens 58 which images the light transmitted through the face 46 onto a light sensitive element.

The body 40 of FIG. 1B includes a deflecting wedge 55 which is positioned in the path of radiation from an emitter 49 located in cavity 48 that transits the reflecting face 46; the other portion being reflected along the axis of the channel 44 into the fiber. The interface between wedge 55 and the surrounding air will transmit most of the emitter light striking it from the face 46. A portion is reflected and the shape of wedge 55 is provided to direct away from the detector cavity 42 the Fresnel reflected portion of the radiation so as to avoid cross talk. In addition, the body 40 may be coated with an absorbing layer in selected locations in order to further attenuate the radiation reflected by the wedge 55 and thus further eliminate cross talk. The wedge 55 may be formed of a succession of different angles gradually steepening and thus approximating a curve. This is an efficient molding technique. The shape is adapted to the dimensions of the particular body 40.

Figure 3A:
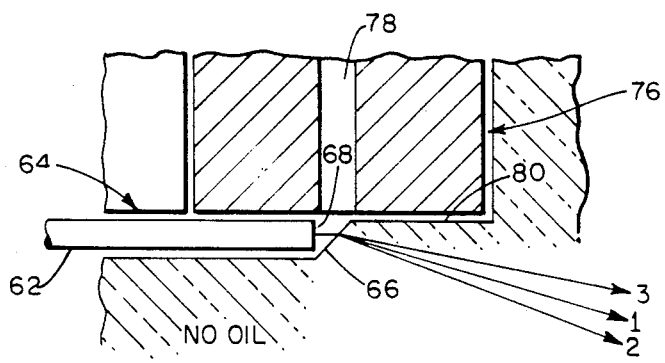
FIGS. 3A and 3B are sectional views of a portion of the coupler body of FIGS. 1A and 1B, showing incoming radiation paths with and without index of refraction matching.
Figure 3B:
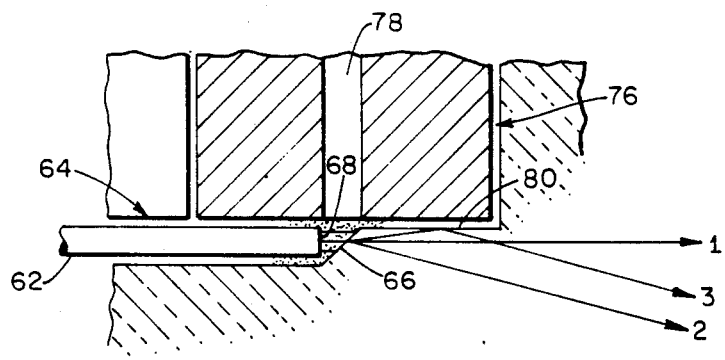

FIGS. 3A and 3B illustrate the effect on light of the presence and absence of index of refraction matching material, such as an epoxy. In FIG. 3A, an optical fiber 62 is provided in a channel 64 in which the region between a reflecting face 66 and a termination 68 of the fiber 62 is not filled with an index of refraction matching material such as an epoxy. In that case, light passing through the surface 66 will be refracted downwardly off the axis of the fiber 62 toward a detector, not shown. As illustrated in FIG. 3A, the emitter is shown to include an optical fiber pigtail 78 surrounded by a ferrule 80 providing an interference fit within a cavity 76. The pigtail 78 transmits the radiation from the emitting semiconductor material down to a location proximate to the reflecting surface 66. A deflecting wedge is provided directly below the surface 66 to reflect away from the detector radiation from the emitter as noted above. In FIG. 3B, the presence of an index matching material produces a direct transmission of the light through face 66 without refraction. An upper diverging side to the beam will strike the bottom 80 of emitter cavity 76 and be totally internally reflected back to the detector.

Figure 4:
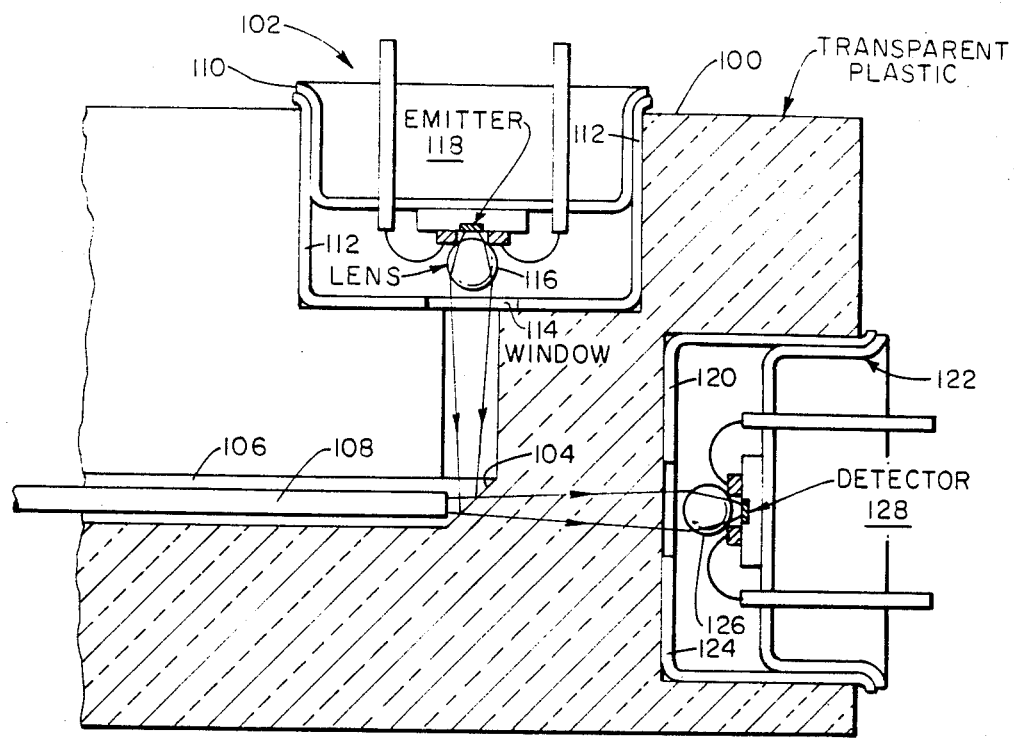
FIG. 4 is a sectional view of a modification to the coupler body of FIGS. 1A and 1B.
Figure 5:
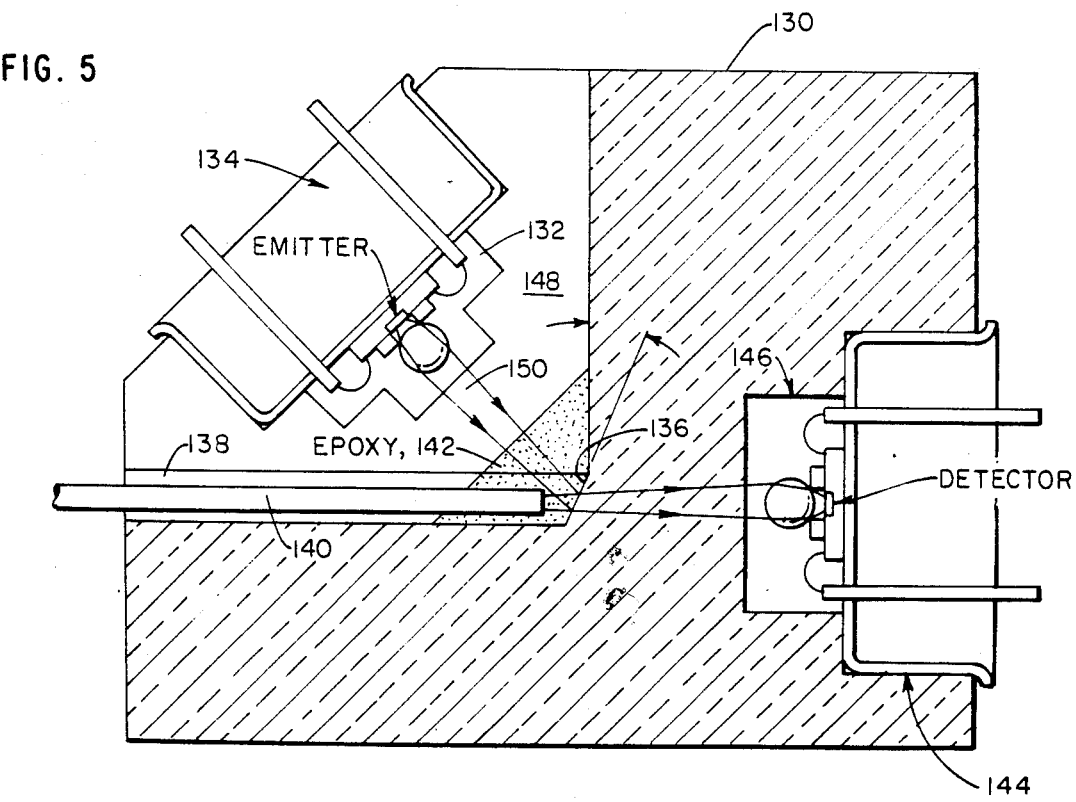
FIG. 5 is a sectional view of a further modification to the coupler body of the present invention.

It may be desirable to position the emitter away from its location proximate to the reflecting face at the termination of the optical fiber channel in order to permit closer location of the detector assembly and detector cavity and to avoid the presence of any interfaces or borders of the coupler body in the path of radiation coupled from the optical fiber through the reflecting face into the detector. Embodiments which accomplish this objective are illustrated in FIGS. 4 and 5. In FIG. 4, a coupler body 100 has an emitter cavity 102 terminating at a distance above a reflecting face 104 located at the termination of a V-groove channel 106 adapted to hold and align an optical fiber 108 in both lateral position and axially as close to the surface 104 as possible. The emitter cavity 102 is illustrated to have an emitter 110 positioned therein with a terminal cap 112 used to define the depth of penetration of the assembly of the emitter 110. The cap 112 has a window 114 through which radiation is imaged by a spherical lens 116 from a light emitting semiconductor element 118. Light is imaged by the lens 116 through the window 114 for reflection, or beam splitting, by the reflecting face 104 and is applied to the fiber 108. Typically the radiation imaged by the lens 116 will have its waist located at or near the location of the termination of the fiber 108.

The lens 116 is employed to gather as much radiation as possible from the emitting element 118 for transmission over the distance between it and the reflecting surface 104 and into the termination of the fiber 108. By locating the emitter assembly 110 well above the reflecting face 104, a detector cavity 120 can be placed to receive radiation transmitted through the reflecting face 104 without interference from adjacent faces of the coupler body 100 such as the emitter cavity. A detector assembly 122 is typically placed within the cavity 120, and positioned by a hermetic sealing cap 124. In the case of a small area detector, as illustrated, a spherical lens 126 is preferably utilized for focusing the slightly diverging beam transmitted by the beam splitting face 104 onto a detecting element 128. If further lensing is required, the plastic body may have a lens molded as shown in FIG. 1B. This lens need not be precise as even small detector areas are typically larger than emitter areas.

The embodiment of FIG. 4 is illustrated with a further modification in FIG. 5 in which the right angle between the emitted beam and the optical fiber is reduced to an acute angle by positioning, within a coupler body 130, a cavity 132 to the left of the cavity illustrated in FIG. 4. In this case, radiation provided from an emitter assembly 134 is reflected at an acute angle by a beam splitting face 136 at the termination of a V-shaped channel 138 which holds an optical fiber 140. To accommodate this acute angle of reflection, the beam splitting face 136 is angled at approximately 60-70° with respect to the axis of the optical fiber 140.

Typically an epoxy fillet 142 is provided around the termination of the fiber 140 and beam splitting face 136 to match the index of refraction of the body 130 for light applied to a detector assembly 144 within a detector cavity 146, and to provide a surface 148, substantially perpendicular to the axis of a beam 150 from the emitter assembly 134. The 60-70° angle of the beam splitting face 136 is of advantage in avoiding polarization selectivity in the portions of radiation reflected and transmitted by the face 136. This is of importance when the dielectric coating is to be a dichroic filter for use in multiplexing. Polarization effects may prevent effective wavelength separation in a 45° cemented filter. The geometry of FIG. 5 also removes the emitter assembly region from the region of the detector assembly to provide flexibility in the location of the detector assembly to accommodate large or small area detectors as desired. It is to be noted that an epoxy fillet may be utilized also at the termination of the optical fiber 108 illustrated in FIG. 4.

To function as a frequency multiplexer or demultiplexer, the surfaces 30, 46, 66, 104, and 136 are coated with layers that produce reflection in one frequency band and transmission in another, thereby permitting two emitters or two detectors to couple to the fiber at distinct frequencies.

The above description encompasses a bi-directional fiber optic coupler for use in two directional communication over an optical fiber. The exemplary embodiments described above are provided to illustrate the invention, the scope of which is limited solely in accordance with the following claims.

What is claimed is:

1. A bi-directional coupler for an optical fiber termination, comprising:
   a monolithic coupler body of a light transmissive substance of substantially homogeneous index of refraction having an outer surface;
   said monolithic coupler having a first integral cavity in communication with said outer surface for receiving a first semiconductor optical transducer along a first axis;
   said monolithic coupler body having a second integral cavity in communication with said outer surface for receiving a second semiconductor optical transducer along a second axis;
   said monolithic coupler body having an integral internal and elongated optical fiber receiving channel along a third axis which is at a substantially inclined angle to said second axis;
   said optical fiber receiving channel terminating on its internal end in an optical surface integrally formed within said monolithic coupler body operative to provide a first light path wholly within said coupler body defined between the first axis of said first integral cavity and the third axis of said optical fiber receiving channel and operative to provide a second light path defined between the second axis of said second integral cavity and the third axis of said optical fiber receiving channel by reflection from said optical surface; and
   said second integral cavity terminating at said optical fiber receiving channel adjacent to said optical surface.

2. A bi-directional coupler for an optical fiber termination, comprising:
   a monolithic coupler body of a light transmissive substance of substantially homogeneous index of refraction having an outer surface;
   said monolithic coupler body having a first integral cavity in communication with said outer surface for receiving a light detector along a first axis;
   said monolithic coupler body having a second integral cavity in communication with said outer surface for receiving a light emitter along a second axis;
   said monolithic coupler body having an integral internal and elongated optical fiber receiving channel along a third axis which is at a substantially inclined angle to said second axis;
   said optical fiber receiving channel terminating on its internal end in an optical surface integrally formed within said monolithic coupler body operative to provide a first light path wholly within said coupler body defined between the first axis of said first integral cavity and the third axis of said optical fiber receiving channel and operative to provide a second light path defined between the second axis of said second emitter cavity and the third axis of said optical fiber receiving channel by reflection from said optical surface; and
   said second integral cavity terminating at said optical fiber receiving channel adjacent to said optical surface.

3. The coupler of claim 2, wherein said optical surface is coated to function as a beam splitter for radiation directed toward said optical surface from said second cavity to reflect a portion thereof along said channel and for radiation from said channel to reflect a portion thereof towards said emitter cavity.

4. The coupler of claim 2, further including an emitter assembly for applying light to said optical surface to be reflected towards said channel.

5. The coupler of claims 4 or 3, wherein said channel is V-shaped.

6. The coupler of claim 5, wherein said optical surface forms an angle of 60-70° to said channel and the light path from said emitter cavity to said channel includes an acute angle.

7. The coupler of claims 2 or 4 further including an optical fiber within said channel having a light receiving and emitting termination proximate to said optical surface.

8. The coupler of claim 7 further including index matching epoxy for cementing said optical fiber within said channel and filling the space between the fiber termination and said optical surface.

9. The coupler of claim 2 further including
a ferruled emitter assembly having a light beam and centered within said emitter cavity;
said optical surface is located to receive said light beam.

10. The coupler of claim 4 wherein said body further includes means for directing away from said detector cavity any light from said emitter passing through said optical surface.

11. The coupler of claim 2, including a lens integral with said body and responsive to radiation passing through said optical surface for focusing the radiation toward said detector cavity.

12. The coupler of claim 2 further including:
an optical fiber within said channel;
index of refraction matching material within said channel between a termination of said fiber and said optical surface.

13. The coupler of claim 2 further including:
an optical fiber within said channel having a termination proximate to said optical surface;
an anti-reflective coating on said optical fiber termination.

14. The coupler of claim 2, further including index of refraction matching material within said detector cavity.

15. The coupler of claim 2, wherein said optical surface includes a frequency dependent dielectric coating adapting said coupler for multiple frequency operation as a multiplexer or demultiplexer.

16. The coupler of claim 2 wherein said body comprises a transparent molded plastic.

17. The coupler of claim 16 wherein said plastic includes an acrylic or polycarbonate.

18. The coupler of claim 2 further including a ledge within said emitter cavity adapted to prevent an emitter assembly positioned within said cavity from contacting said optical surface.

* * * * *

UNITED STATES PATENT AND TRADEMARK OFFICE
CERTIFICATE OF CORRECTION

PATENT NO.  : 4,611,884

DATED       : September 16, 1986

INVENTOR(S) : Harold Roberts

It is certified that error appears in the above-identified patent and that said Letters Patent is hereby corrected as shown below:

Column 6, line 60, "second emitter cavity" should read --second integral cavity--

Column 7, line 3, "emitter cavity." should read --second cavity.--

Column 7, line 7, "claims 4 or 3," should read --claims 2 or 4,--

Column 8, line 15, "including index" should read --including an index--

Signed and Sealed this

Twenty-fifth Day of October, 1988

*Attest:*

DONALD J. QUIGG

*Attesting Officer*  *Commissioner of Patents and Trademarks*